(12) United States Patent
Dalgaard-Nielsen

(10) Patent No.: US 10,605,330 B2
(45) Date of Patent: Mar. 31, 2020

(54) DRIVE-BELT CONNECTING DEVICE DESIGNED FOR THE TENSION-RESISTANT CONNECTION OF FLAT DRIVE-BELT END SECTIONS, DRIVE BELT, AND CONVEYING DEVICE EQUIPPED THEREWITH

(71) Applicant: NORDISCHER MASCHINENBAU RUD. BAADER GMBH + CO. KG, Luebeck (DE)

(72) Inventor: Ib Verner Dalgaard-Nielsen, Hoerning (DK)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 16/096,082

(22) PCT Filed: Apr. 26, 2016

(86) PCT No.: PCT/EP2016/059314
§ 371 (c)(1),
(2) Date: Oct. 24, 2018

(87) PCT Pub. No.: WO2017/186276
PCT Pub. Date: Nov. 2, 2017

(65) Prior Publication Data
US 2019/0136942 A1    May 9, 2019

(51) Int. Cl.
*F16G 3/16* (2006.01)
*F16G 3/08* (2006.01)
(Continued)

(52) U.S. Cl.
CPC .............. *F16G 3/16* (2013.01); *B65G 15/00* (2013.01); *B65G 15/30* (2013.01); *B65G 17/36* (2013.01);
(Continued)

(58) Field of Classification Search
CPC ... B65G 15/30; F16G 3/08; F16G 3/16; F16G 3/003; F16G 3/07
(Continued)

(56) References Cited

U.S. PATENT DOCUMENTS 4,617,716 A * 10/1986 Lay ........................... D01F 9/32
24/31 B
4,906,226 A * 3/1990 Hecker .................... F16G 3/08
474/257
(Continued)

FOREIGN PATENT DOCUMENTS

CN    101018661    8/2007
CN    105173530    12/2015
(Continued)

OTHER PUBLICATIONS

Russian Search Report documents (with English translation of parts thereof) issued in Russian application No. 2018139803/11 (18 pages).
(Continued)

*Primary Examiner* — James R Bidwell
(74) *Attorney, Agent, or Firm* — Greenblum & Bernstein, P.L.C.

(57) ABSTRACT

The invention relates to a drive belt connecting device for the tension-resistant connection of flat drive belt end sections (93, 94), which drive belt connecting device comprises a multi-part connecting body (41), which has connecting parts (1, 2, 3) and a connecting chamber (42), which accommodates the drive belt end sections (93, 94), which have at least one first belt flat side having a belt surface profile (911) in an overlapping arrangement for tension-resistant connection. A first outer connecting part (1) and a second outer connecting part (2) bound the connecting chamber (42), in which an inner connecting part (3) having (Continued)

inner connecting surfaces (301, 302) is arranged. The inner connecting surfaces and outer connecting surfaces (101, 201) of the outer connecting parts (1, 2) can be placed onto the drive belt end sections (93, 94). A fastening means (5) fastens the outer connecting parts (1, 2) to each other at a limited fixed distance. An inner connecting means (30) connects the inner connecting part (3) to at least one of the two outer connecting parts (1, 2) for connection that is secure in the belt tension direction. A flat drive belt (90) is connected to a circulating continuous flat drive belt (90) by means of at least one said drive belt connecting device (4). A conveying device (7) comprises two such drive belts (901, 902), which can be guided and driven along a conveying path (78) and a return path (79) to circulate together and in parallel, wherein one conveyor belt (75) is formed by a series of transport elements (73) arranged in parallel and transport blocks (74) fastened onto the two drive belts (901, 902) to support said transport elements. Connecting bodies (41) of the drive belt connecting devices (4) are configured as transport blocks (74).

27 Claims, 5 Drawing Sheets (51) Int. Cl.
| | | |
|---|---|---|
| *B65G 15/30* | (2006.01) | |
| *B65G 17/12* | (2006.01) | |
| *B65G 15/00* | (2006.01) | |
| *B65G 17/36* | (2006.01) | |
| *F16G 1/28* | (2006.01) | |
| *B65G 23/06* | (2006.01) | |
| *B65G 47/61* | (2006.01) | |

(52) U.S. Cl.
CPC ................ *F16G 1/28* (2013.01); *F16G 3/08* (2013.01); *B65G 17/12* (2013.01); *B65G 23/06* (2013.01); *B65G 47/61* (2013.01)

(58) Field of Classification Search
USPC ....... 198/844.2; 24/31 R, 33 L, 37; 474/202, 474/218
See application file for complete search history.

(56) References Cited

U.S. PATENT DOCUMENTS

| | | | | |
|---|---|---|---|---|
| 5,213,182 | A | | 5/1993 | Guckert |
| 5,419,744 | A | | 5/1995 | Kagebeck |
| 7,810,219 | B2 | | 10/2010 | Lindemann |
| 8,763,208 | B2 | * | 7/2014 | Busch ...................... F16G 3/16 24/31 R |
| 9,169,106 | B2 | * | 10/2015 | Christen ................. B66B 13/08 |
| 9,347,520 | B2 | * | 5/2016 | Wolf ......................... F16G 3/10 |
| 2008/0060171 | A1 | * | 3/2008 | Lindemann ............... F16G 3/08 24/31 R |
| 2013/0143705 | A1 | | 6/2013 | Wolf |
| 2019/0116817 | A1 | | 4/2019 | Herbst |
| 2019/0133141 | A1 | | 5/2019 | Schubert |
| 2019/0133142 | A1 | | 5/2019 | Hensel |

FOREIGN PATENT DOCUMENTS

| | | |
|---|---|---|
| DE | 24160 | 9/1883 |
| DE | 202 09 04 | 11/1980 |
| DE | 292 09 04 | 11/1980 |
| EP | 0 543 523 | 5/1993 |
| EP | 0 628 141 | 9/1993 |
| EP | 2 600 033 | 6/2013 |
| JP | 58-5554 | 1/1983 |
| JP | S5993548 | 5/1984 |
| JP | H0469433 | 3/1992 |

OTHER PUBLICATIONS

PCT Search Report and Written Opinion issued in PCT/EP2016/059314.
Russian Search Report (English translation) issued in Russian application No. 2018139803/11 (2 pages).
Chinese Office Action dated Apr. 24, 2019 in Application No. 201680085028 (5 pages).
Office Action issued in Chilean Application No. 2018003035.

\* cited by examiner

DRIVE-BELT CONNECTING DEVICE DESIGNED FOR THE TENSION-RESISTANT CONNECTION OF FLAT DRIVE-BELT END SECTIONS, DRIVE BELT, AND CONVEYING DEVICE EQUIPPED THEREWITH

CROSS-REFERENCE TO RELATED APPLICATIONS

The instant application is a US National stage of PCT International Application No. PCT/EP2016/059314 filed Apr. 26, 2016.

BACKGROUND OF THE INVENTION

1. Field of the Invention

The invention relates to a drive belt connecting device designed for the tension-resistant connection of flat drive belt end sections, each having two belt flat sides, of which at least one first belt flat side has a belt surface profile, said drive belt connecting device comprising a multi-part connecting body with a longitudinal dimension in the belt-tension direction, which has connecting parts in an overlapping arrangement and a connecting chamber to accommodate the flat drive belt end sections for connection, wherein the connecting parts can be fastened to each other for tension-resistant connection of the drive belt end sections and are configured for connecting arrangements with profiled connecting surfaces for positive-locking engagement into the belt surface profiles. The invention relates to a flat drive belt that is connected to a continuously circulating flat drive belt by way of at least one drive belt connecting device. The invention further includes a conveying device comprising two circulating flat drive belts, continuously connected in each case by way of at least one said drive belt connecting device.

2. Discussion of Background Information

Connecting devices for connecting belt elements, in particular toothed belt elements, are known in a number of different designs. The connecting devices are designed to join unilaterally toothed belt ends of one and the same belt to form a circulating belt or belt ends from two belts that are to be joined. Particularly if the joined belts are used as drive belts in conveying devices or the like, particularly as driven belts of conveying transport elements for transporting objects, high tensile strength and durability of the connection is particularly important. In cases where a flat drive belt is connected by way of a connecting device to form a continuously circulating or guided circular belt, the belts must have the necessary flexibility to allow the curvature or bending required for changing direction. Drive belts or toothed belts are normally curved concave to the deflection on one flat side profiled with toothing. Here it is also important that a circulating drive belt can run through a drive belt connecting device without any interference.

Drive belts such as toothed belts, which are in particular used in machines and conveying devices in the food processing industry, are subject to special hygiene requirements. The connected drive belts must also be protected, particularly at the belt connecting device, and it must be possible to clean them adequately to remove residues, deposits, operating materials and the like.

Normally, known belt connecting devices are designed so that they receive the belt ends to be connected between clamps and/or clamping plates. Fastening mechanism with fastening elements, which are aligned perpendicular to belt end sections connected to flat sides of the belt and comprise recesses or holes in flat sides of external clamping plates, are provided to produce a clamp connection or positive-locking connection of the belt end sections. This restricts design options for the clamping plates, for example for attaching guide elements or bearing elements. Snap couplings in particular (for example EP 0 628 141 B1), give rise to protrusions or undercuts. As well as providing a positive-locking engagement by clamping, fastening mechanism of known belt connecting devices generate a compressive force, which stresses or even deforms the surface profile of the belt by squashing it.

On the one hand, there are belt connecting devices which accommodate the belt end sections to be connected in one plane without any overlap (e.g. EP 0 543 523; EP 0 628 141 B1; U.S. Pat. No. 7,810,219 B2). On the other hand, belt connecting devices, in which connected belt end sections overlap are known (e.g. EP 2 600 033).

SUMMARY OF THE INVENTION

The aims of the invention are to produce a compact drive belt connecting device that provides gentle, clamping-force-free and durable connection of the drive belt end sections. The drive belt connecting device has to meet particular requirements in terms of hygiene and the avoidance of contamination. In particular, the connecting body of the drive belt connecting device should be compact with a simple surface design, so that it provides a functional body to guide bodies and to bear elements.

In conjunction with the features of the aforementioned belt connecting device, the type of which is known from EP 0 543 523, the aims are achieved in that the connecting chamber to accommodate the drive belt end sections in an overlapping arrangement is arranged along a connecting line extending in the longitudinal dimension of the connecting body, wherein a first outer connecting part and a second outer connecting part bound the connecting chamber and comprise an associated first outer connecting surface and a second outer connecting surface, which can be placed, on the one hand, onto the one drive belt end section and, on the other hand, onto the other drive belt end section in a connecting arrangement, and wherein an inner connecting part with a first inner connecting surface and an opposing second inner connecting surface is arranged inside the connecting chamber, which can be placed, on the one hand, onto the one drive belt end section and, on the other hand, onto the other drive belt end section in a connecting arrangement, wherein the first outer connecting surface and the first inner connecting surface are opposite each other, on the one hand, and the second outer connecting surface and the second inner connecting surface are opposite each other, on the other hand, that furthermore a fastening mechanism is provided to fasten the first outer connecting part and the second outer connecting part to each other at a limited fixed distance between the first outer connecting surface and the second outer connecting surface, and that a connecting mechanism is provided to connect the inner connecting part to at least one of the two outer connecting parts for connection that is secure in the belt tension direction.

A number of advantages are achieved by the invention. The inner connecting part lies embedded between the drive belt end sections that are to be connected. The connecting chamber is configured, arranged and dimensioned in such a way that the drive belt end sections rest in a positive-locking engagement on one of the outer connecting parts, on the one hand, and on the inner connecting part, on the other hand. The arrangement is determined by a limited fixed distance between the first outer connecting surface and the second outer connecting surface. The distance can be adjusted or set by way of the fastening mechanism, so that the tension-resistant connection is substantially achieved by the positive-locking connections. The connecting parts do not exert any clamping force, or only a limited defined clamping force, on the drive belt end sections. Due to the connecting mechanism, the inner connecting part is preferably in direct engagement with at least one outer connecting part in such a way that it is immovably held in the belt tension direction or in the longitudinal dimension of the drive belt connecting device, that is to say in the direction of the connecting line.

Drive belts concerned by the invention, such as toothed belts or the like, are subject to particular loading in operation, due to load cycles, for example, or generally due to load conditions between standstill and the maximum speed at which a drive belt is operated. Despite such loading, the fastening mechanism of the drive belt connecting device according to the invention can be simply designed, in particular as a simple screw connection, which is exempt from generating clamping force for connecting the flat drive belt end sections, thereby increasing tensile strength. The outer connecting parts can also be designed and arranged so that they remain largely free from the fastening mechanism, particularly advantageously on outer sides, which extend parallel to the outer connecting surfaces. As a result, the contour and shape of the drive belt connecting device can be configured to a large extent independently of the arrangement and function of the fastening mechanism. This is particularly advantageous in terms of shape configuration and attachment of attachment elements such as bearing elements of or on sides or walls of the drive belt connecting device. For example, a formed part can be arranged on a region of the body to cooperate with at least one guiding device. The drive belt connecting device of the invention also allows special attachment or bearing elements to be attached to bear the transport elements.

A particular advantage of the drive belt connecting device of the invention is that it allows the provision of a particularly robust flat drive belt, which is connected by way of at least one drive belt connecting device to a continuously circulating flat drive belt. With two continuous drive belts connected in this way, it is possible to form a particular conveying device comprising two flat drive belts, which are arranged in a parallel arrangement at a parallel interval and can be guided and driven to circulate together along a conveying path and a return path, and comprising at least two of the drive belt connecting devices, one of which continuously connects the one flat drive belt and the other connects the other flat drive belt, wherein a conveyor belt is formed by a series of parallel transport elements and transport blocks, which are fastened onto the flat transport belts for carriage and each form a transport bearing in their pairs, which bears a transport element between the two flat drive belts to convey an object, and wherein the connecting bodies of the drive belt connecting devices are configured as so-called transport blocks.

As regards the configuration of the fastening mechanism, an advantageous design of the drive belt connecting device consists of the fastening mechanism being fitted with fastening elements, which are arranged outside the connecting chamber transversely to the direction of the connecting line and transversely to a layering direction of the connecting parts, which is determined by the overlapping arrangement of the connecting parts. Functional sides or surfaces, which extend on the outside of the drive belt connecting device opposite the outer connecting surfaces, remain completely free from fastening elements.

Expediently, the connecting mechanism, which connects the inner connecting part to at least one of the two outer connecting parts can be configured as a positive-locking connection, which secures the inner connecting part in the drive belt connecting device against shifting or displacement in the belt tension direction. A tongue/groove connection is particularly suitable as a positive-locking connection. For example, a projection aligned transversely to the inner connecting surfaces in particular and forming a tongue element is provided on at least one longitudinal end of the inner connecting part determined by the longitudinal dimension of the drive belt connecting device, said tongue element engaging in a positive-locking engagement into a corresponding recess in at least one of the outer connecting parts. In a design in which all connecting surfaces and the drive belt end sections are profiled on both flat sides of the belt, such a connection can also, of course, form the connecting mechanism to secure the inner connecting part inside the connecting body.

The drive belt connecting device of the invention allows the connection of drive belt end sections, which are preferably profiled with toothing on at least one side. Profiles that are complementary to the belt profiles or correspond to the same are formed on the outer connecting parts and the inner connecting part.

For example, the first inner connecting surface is profiled for positive-locking engagement into a belt surface profile of the belt flat side of a corresponding flat drive belt end section. Instead or additionally, the second outer connecting surface can be profiled for positive-locking engagement into a belt surface profile of the belt flat side of a corresponding flat drive belt end section.

Particularly in a design with profiled first inner connecting surface of the inner connecting part, its second inner connecting surface is formed to rest in a planar connecting arrangement against a corresponding planar flat side of an associated flat drive belt end section. In a design with the profiled first inner connecting surface and the planar second inner connecting surface, the first outer connecting surface is expediently also configured to rest in a planar connecting arrangement against a corresponding planar flat side of an associated flat drive belt end section. As a result, the second outer connecting surface is profiled.

For example, in order to connect the drive belt end sections of one and the same drive belt, which has toothing on one side, to form a circulating drive belt, the first outer connecting surface and the second inner connecting surface, on the one hand, and the first inner connecting surface and the second outer connecting surface, on the other hand, are of the same design.

Despite overlapping of the drive belt end sections inside the drive belt connecting device of the invention, any misalignment resulting from the overlap can be reduced or compensated for. To this end, the inner connecting part is arranged diagonally inside the connecting chamber to produce the required amount of diagonal overlap of the drive belt end sections being connected along the connecting line.

In a preferred design, the first outer connecting part is formed by a connecting housing with a housing inner chamber into which the inner connecting part and the second outer connecting part can be inserted in a snug fit. The outer connecting part forms a cap-like part with a U-shaped front cross-section and with a web wall and leg walls, which encapsulate the inner connecting part on three sides. This encapsulation serves to provide a drive belt connecting device, namely a connecting body, which is largely enclosed on its longitudinal circumference and is also largely protected against dust and fluid by the fit on its end faces, into which the drive belt end sections enter, in order to meet specific hygiene requirements.

In one embodiment, at least one guide element is provided on the drive belt connecting device for the longitudinal guidance of the drive belt connecting device along a guide line. Advantageously, a guiding longitudinal groove extending in the longitudinal dimension of the connecting body and forming the guide element is provided on at least one of the outer connecting parts, it being possible to place the said groove as a sliding guide on a guiding rail determining the guide line. According to a further embodiment, the connecting body comprises at least one link part, which is formed for positive-locking engagement into a link recess of a deflection device.

The transport elements are expediently arranged without any gap between them or as close together as possible along the entire run of the two drive belts. The gapless arrangement of the transport elements provides a quasi-closed circulating conveying surface, which in this form produces a transport mechanism, namely a conveyor belt.

In a particular embodiment of the conveying device of the invention, the transport bearings are configured as pivot bearing points, which in each case deflect the transport element back and forth around a transport element pivot axis, pivot bearing points being formed on each of the transport blocks.

The transport blocks, including the transport blocks formed by the connecting bodies of the drive belt connecting device, are expediently all of identical design.

According to a preferred embodiment, the transport blocks form driveable belt elements with the same formed parts, and the conveying device is configured with a pair of deflection wheels of each circulating guide, wherein the deflection wheels have link recesses on the circumference, which carry the same formed parts of the driveable belt elements for deflection of the belt and, on at least one deflection wheel of the pair of deflection wheels which forms a belt drive mechanism, for driving the flat drive belts.

One design also consists of the conveying device being configured with a guiding device, which has guiding rails arranged on the conveying path and return path of the flat drive belts, and of at least one guide element, which is guided by way of at least one associated said guiding rail, being arranged on each transport block. Two guiding longitudinal grooves, which form the guide elements with longitudinal openings facing away from the flat sides of the belts, are advantageously arranged on each transport block, wherein the one guiding longitudinal groove lies on a first guiding rail arranged on the conveying path and the second guiding longitudinal groove lies on a second guiding rail arranged on the return path.

A conveyor belt according to the invention, that is equipped with pivot-deflected transport elements, can form a troughed belt or similar, particularly with a gapless arrangement of transport elements, in which objects, for example fish for processing, can be conveyed transversely in a particularly tight sequence to deliver them to a processing machine, for example a slaughtering machine. In this case, the conveying device is configured so that the transport elements are formed along a conveying path in at least one transport plane to receive and convey the products. The device is further advantageous in that the transport elements are deflected at an unloading point at the end of the conveying path and/or swivelled out at at least one point of the conveying path in order to discharge the conveyed object from the conveying path.

In the design with pivotable transport elements, their pivoting motion can be controlled to discharge a product and then to pivot back into a conveying position at one point or a plurality of points along the conveying path. The pivoting motion can be effected, for example, by a mechanical link motion, which moves the transport elements to discharge into a lower level below a conveying plane and then moves them back again into the conveying plane. The tipping of the transport element at an unloading point can be activated by a controller, for example in such a way that a guide element cooperating with the tipping part of the transport element is arranged at the unloading point by way of controllable points to control the pivoting motion.

The drive belt connecting devices for guiding and bearing the transport elements are configured to match the transport blocks and, as a consequence, themselves form such transport blocks. The connecting point or points line up in the sequence of transport blocks with the same function and particularly also with the same shape. Like the other transport blocks, the connecting bodies cooperate with the link recesses. To guide the transport blocks in a particular way and to stabilise the conveying motion, in one design the conveying device is equipped with a guiding device, which has at least one guiding rail running along the path of each flat drive belt.

Dependent claims are directed at the said embodiments and also at other expedient and advantageous embodiments of the invention. Only particularly expedient and advantageous embodiments or embodiment options will be described in greater detail, based on the following description of the embodiments illustrated in the schematic drawing. Each individual or detail design described within an embodiment should be understood as a structurally independent detail example for other embodiments and designs which fall within the invention that are not described or not fully described. In particular, designs or features which have a higher-level independent relevance are highlighted by the term "general".

DETAILED DESCRIPTION OF THE INVENTION

Figure 1:
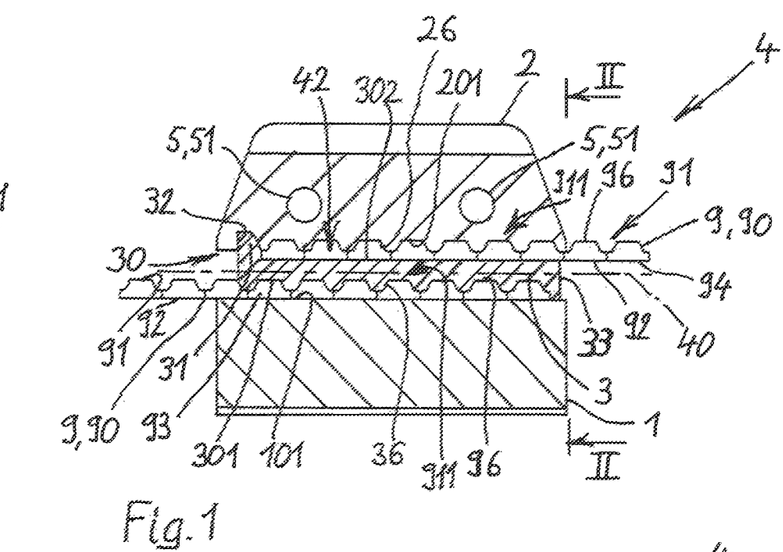
FIG. 1 shows in longitudinal section I-I of FIG. 2, a drive belt connecting device according to the invention in the state of a tension-resistant connection of flat drive belt end sections.
Figure 2:
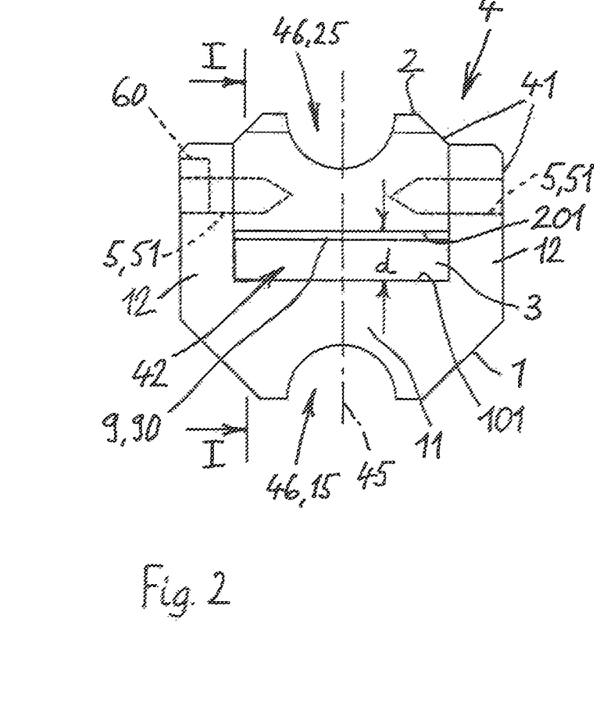
FIG. 2 shows according to II-II in FIG. 2, a frontal view of the drive belt connecting device of FIG. 1.
Figure 3:
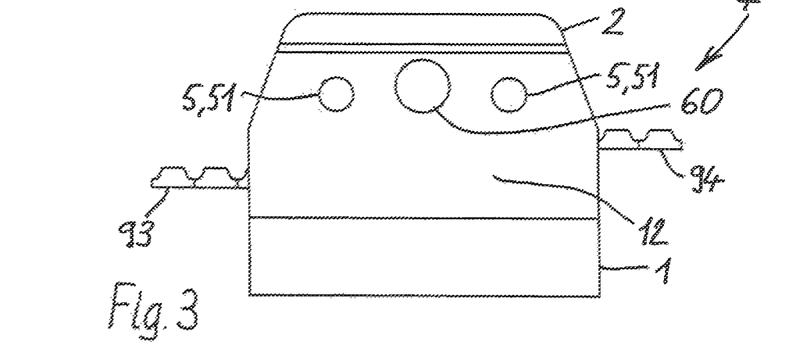
FIG. 3 shows in unedited longitudinal view, the drive belt connecting device according to FIGS. 1 and 2.

As illustrated in FIGS. 1 to 3, a drive belt connecting device 4 according to the invention comprises in an overlapping arrangement, viewed along a vertical centre plane 45 determining a layering direction, a first outer connecting part 1 in the form of a U-shaped, cap-like housing forming a housing inner chamber, with base or web part 11 and two leg walls 12, a second outer connecting part 2 in the form of a plug-in part fitting the cap part and an inner connecting part 3 in the form of a sheet-like part that is arranged in a connecting chamber 42 inside the first outer connecting part 1 between this latter and the second outer connecting part 2. The connecting chamber 42 accommodates the inner connecting part 3 and, in the connected state, two drive belt end sections 93, 94 in an overlapping arrangement along a connecting line 40. The drive belt connecting device 4 is illustrated in FIGS. 1 to 3 in the connected state, i.e. with the drive belt end sections 93, 94 in tension-resistant connection. The outer connecting parts 1, 2 and the inner connecting part 3 together form a connecting body 41 with a longitudinal dimension in which extends the connecting line 40.

The first outer connecting part 1 and the second outer connecting part 2 are fastened to each other by way of a fastening mechanism 5. Fastening elements 51 are for example pins for pin connections such as screw connections, which pass through the leg walls 12 and are anchored in corresponding holes in the second outer connecting part 2.

On the inside of the web part 11 the first outer connecting part 1 has a first outer connecting surface 101 and, in parallel to this, a second outer connecting surface 201 is formed on an inside of the second outer connecting part 2. In the fastened state, the first outer connecting part 1 and the second outer connecting part 2 are fixed to each other at a fixed distance d limited by the fastening, between the first outer connecting surface 101 and the second outer connecting surface 201.

The inner connecting part 3 has a first inner connecting surface 301 and a second inner connecting surface 302. The inner connecting surface 301 is arranged to cooperate with the first outer connecting surface 101 and the second inner connecting surface 302 is arranged to cooperate with the second outer connecting surface 201. What is generally substantial is that the connecting chamber 42 is configured with the distance d, the inner connecting part 3 and all connecting surfaces are configured so that a space is formed, on the one hand, between the first outer connecting surface 101 and the first inner connecting surface 301 to receive the one drive belt end section in a positive-locking engagement. On the other hand, a space is formed between the second outer connecting surface 201 and the second inner connecting surface 302 for receiving the other drive belt end section 94 in a positive-locking engagement. Moreover, it is generally substantial for the inner connecting part 3 to be inserted firmly, that is to say immovably in the direction of the connecting line 40 or in the longitudinal dimension of the connecting body 41, into said connecting body, for forming the spaces when the drive belt connecting device 4 is in the connecting state. FIGS. 1 to 3 show a positive-locking connection in the form of a tongue and groove connection as a connecting mechanism 30. A first transverse edge forms a tongue element 31, that engages in an exact fit into a corresponding recess 32, namely a groove in the second outer connecting part 2.

The transverse dimension of the inner connecting part 3 is dimensioned to sit in a snug fit between the leg walls 12 of the first outer connecting part 1. Such a positive-locking connection, which is a general feature of the drive belt connecting device 4 according to the invention, has the advantage that the inner connecting part 3 can simply be inserted into the connecting chamber 42 without the need for additional connecting mechanism.

On its other transverse side, the inner connecting part 3 has a free transverse edge 33, which is dimensioned to correspond to the distance d in such a way that the connecting chamber is completely closed there on the front side together with the traversed area of the inserted drive belt end section 94.

The drive belt connecting device 4 in FIGS. 1 to 3 is configured to connect drive belt end sections 93, 94 of universal drive belts 9. The drive belt end sections 93, 94 that are connected or to be connected have a first belt flat side 92, which is smooth and even, while the second belt flat side 91 has the tooth profile 911 of a toothing with teeth 96 lying transversely to the extension of the belt. In particular, the connected drive belt end sections 93, 94 can be components of a flat drive belt 90 rendered continuous by the connection.

In the exemplary embodiment, the belt tooth profiles are located on the second belt flat side 91 facing the second outer connecting part 2. Corresponding to this arrangement, the first inner connecting surface 301 is correspondingly profiled with a tooth profile 36 for positive-locking engagement into the belt surface profile of the one drive belt end section 93, wherein, moreover, the second outer connecting surface 201 is configured with a tooth profile 26 for positive-locking engagement into the belt surface profile 911 of the other drive belt end section 34. Moreover, the first outer connecting surface 101 is designed to rest in a positive-locking engagement against the planar (unprofiled) belt flat side 92 of the drive belt end section 93, and the second inner connecting surface 302 of the inner connecting part 3 is smooth and even to rest in a positive-locking engagement against the planar (unprofiled) belt flat side 92 of the other drive belt end section 94.

The positive-locking connection of the drive belt end sections 93, 94 between the inner connecting part 3 and the outer connecting part 1 or 2 respectively is configured by adjusting the distance d so that the positive-locking engagement is provided substantially free from pinching, however possibly with a relatively small amount of clamping, that is precisely limited by the distance d, transverse to the belt flat sides 91, 92, by way of the fastening mechanism 5.

As can be seen from FIGS. 1 to 3, a particular additional design consists of the drive belt connecting device 4 or the connecting body 41 being configured with guide elements 46 extending in the longitudinal dimension to guide the drive belt connecting device 4 along a guide line. In the exemplary embodiment, the guide elements 46 are formed by guiding longitudinal grooves 15, 25, which can be placed on at least one guiding rail 72 defining the guide line, as is described below by way of an example.

The guiding longitudinal grooves 15, 25 are centrally intersected by the vertical centre plane 45 of the connecting body 41, wherein the guiding longitudinal groove 15 is formed outside on the web wall 11 of the first outer connecting part 1, while the other guiding longitudinal groove 25 is formed on the outside of the second outer connecting part 2. The guiding longitudinal grooves 15, 25 exhibit a semicircular cross-section, for example.

In another further design of the drive belt connecting device 4 or the connecting body 41 emerging from FIGS. 1 to 3, the leg walls 12 of the first outer connecting part 1, together with an outer part of the second outer connecting part 2 protruding on the first outer connecting part 1, are provided with a formed part with, for example a trapezoidal moulding, forming a trapezoidal head, as can be seen from FIGS. 1 and 3 in particular. The moulding generally forms a formed part that can be configured to cooperate with a deflection device, in which the formed part is entrained, for example, as a link part with link recesses to guide the drive belt connecting device 4. An example is described below with the aid of FIGS. 5 to 7.

A bearing element 60, which in the exemplary embodiment is arranged level with and next to the fastening elements 51, is arranged in the longitudinal centre on the one leg wall 12 of the first outer connecting part 1. This bearing element 60 is provided as a component of a transport bearing 6, which is equipped for mounting and bearing a transport element 73 to convey an object. Design and function are described with the aid of an exemplary embodiment in accordance with FIGS. 4 and 5.

Figure 4:
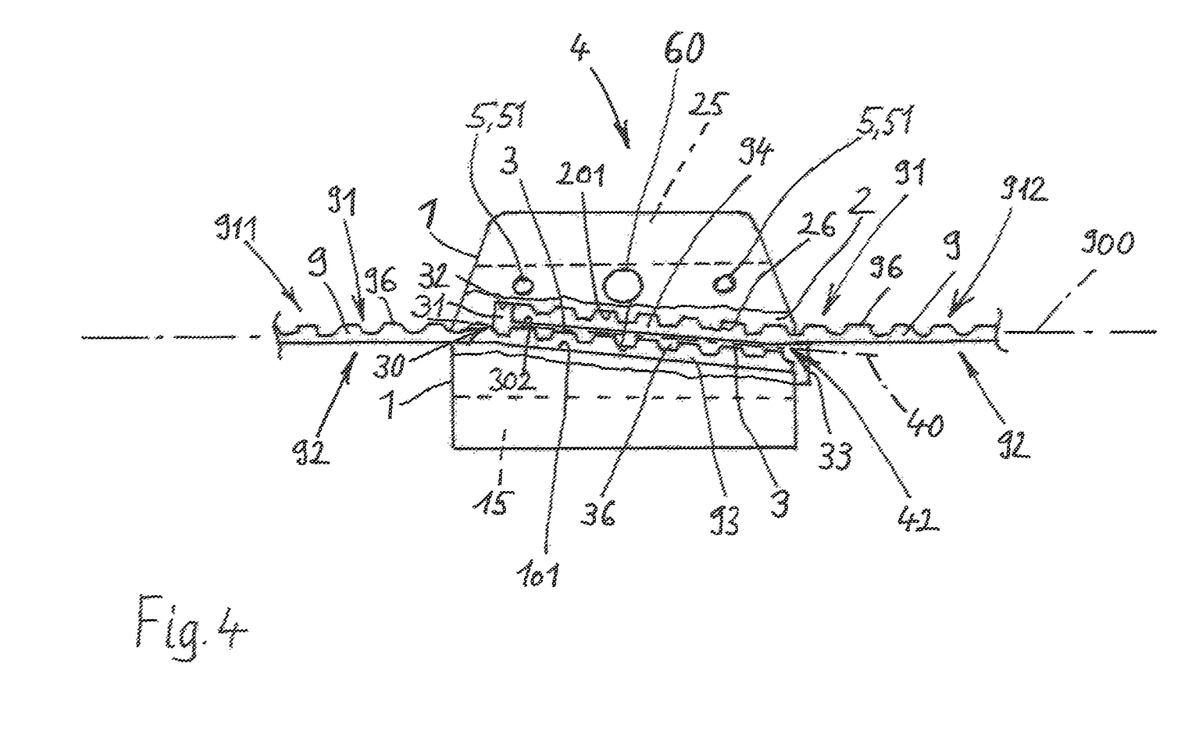
FIG. 4 shows in longitudinal view with detail in the connecting area, a further drive belt connecting device according to the invention.

FIG. 4 shows a further drive belt connecting device 4, the essential design of which corresponds to the drive belt connecting device according to FIGS. 1 to 3. The same reference numerals are used for corresponding parts. One difference is that the inner connecting part 3 is arranged diagonally inside the connecting chamber 42 to produce diagonal overlapping of the drive belt end sections 93, 94 along the connecting line 40. Accordingly, the first outer (planar) connecting surface 101 and the second outer (profiled) connecting surface 201 are arranged diagonally and parallel to each other, in order to form the connecting chamber 42 for the diagonal arrangement of the inner connecting part 3. The diagonal arrangement is generally organised with an oblique angle in such a way that the drive belt end sections 93, 94 come to lie in a common straight belt tension line 900 to match the overlapping dimension of the drive belt end sections 93, 94 or at the distance d.

The inner connecting part 3 has a higher transverse edge in the diagonal position and, as described above, the said transverse edge forms a connecting tongue part 331 of the inner connecting mechanism 30. The opposite transverse edge 33 of the inner connecting part 3 is formed as an outer edge which, as a further component of the inner connecting mechanism 30, sits in a positive-locking engagement on the corresponding transverse edge of the first outer connecting part 1. In general, the transverse edges 31, 33 are aligned so that, together with the drive belt end sections 93, 94, they seal the front face of the connecting body 41.

Figure 5:
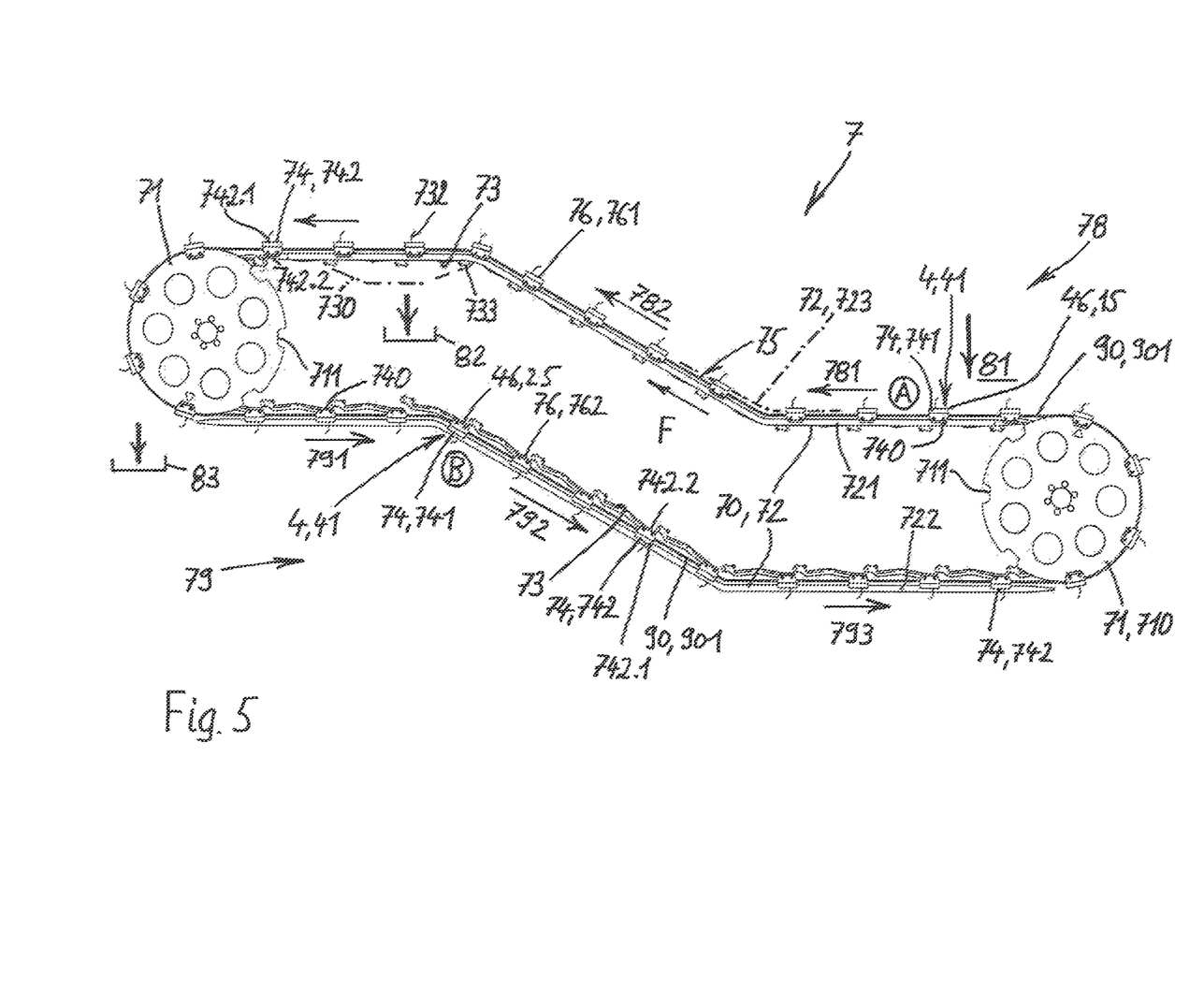
FIG. 5 shows in longitudinal view, a conveying device according to the invention.

As in the exemplary embodiment of FIGS. 1 to 3, the first outer connecting part 1 is formed as a trapezoidal head together with matching dimensioning of the second outer connecting part 2 in the longitudinal dimension of the connecting body 41. A formed part 740 is thereby configured as a link part, which goes into a link recess 711 for positive-locking engagement, as is shown in FIG. 5, for example. In the same way as described with the aid of FIGS. 1 to 3, fastening elements 51 of the fastening mechanism 5 are provided on the leg walls 12 of the first outer connecting part 1 for fastening the first outer connecting part 1 to the second outer connecting part 2 with a fixed distance d between the two outer connecting surfaces 101, 201.

FIG. 5 shows a conveying device 7 according to the invention, into which drive belt connecting devices 4 according to the invention, which are configured for example like the drive belt connecting device 4 according to FIG. 4, are integrated as essential components.

The conveying device 7 comprises two continuous flat drive belts 90, 901, 902, which are arranged in a parallel arrangement at a parallel interval and are guided to circulate along a conveying path 78 and a return path 79 by way of deflection wheels 71. One pair of the deflection wheels 71 are drive deflection wheels 710, which are synchronously operated by way of a drive device (not illustrated). It can be expedient to directly drive all deflection wheels 71 synchronously.

Each flat drive belt 901, 902 is connected to the continuous belt by at least one drive belt connecting device 4 according to the invention. FIG. 5 shows a long side of the conveying device 7 with the continuous flat drive belt 901. The drive belt 901 with components and guide is described in more detail. This description is equally valid for the other drive belt 902 in terms of components and arrangement.

In the exemplary embodiment of FIG. 5, there are, for example, drive belt connecting devices 4 at a position A and a position B. As can be seen in FIG. 5, the continuous flat drive belt 901 is guided around the deflection wheels 71, which are mounted at staggered heights. Between the deflection wheels 71 there is an upper conveying path 78 which, in the conveying direction proceeding from a loading point 81 in the region of the driven deflection wheel 710, initially runs horizontally in a section 781, then obliquely upwards in a section 782 and then, in a section 783, horizontally again towards the other higher deflection wheel 71. In the same way, but in reverse order, the flat drive belt 901 is guided from the higher deflection wheel 71 to the drive deflection wheel 710 along a return path 79 with corresponding sections 791 to 793. The arrangement and guidance of the other flat drive belt 902 with deflection wheels 71 take place, as mentioned, in the same way.

Figure 6:
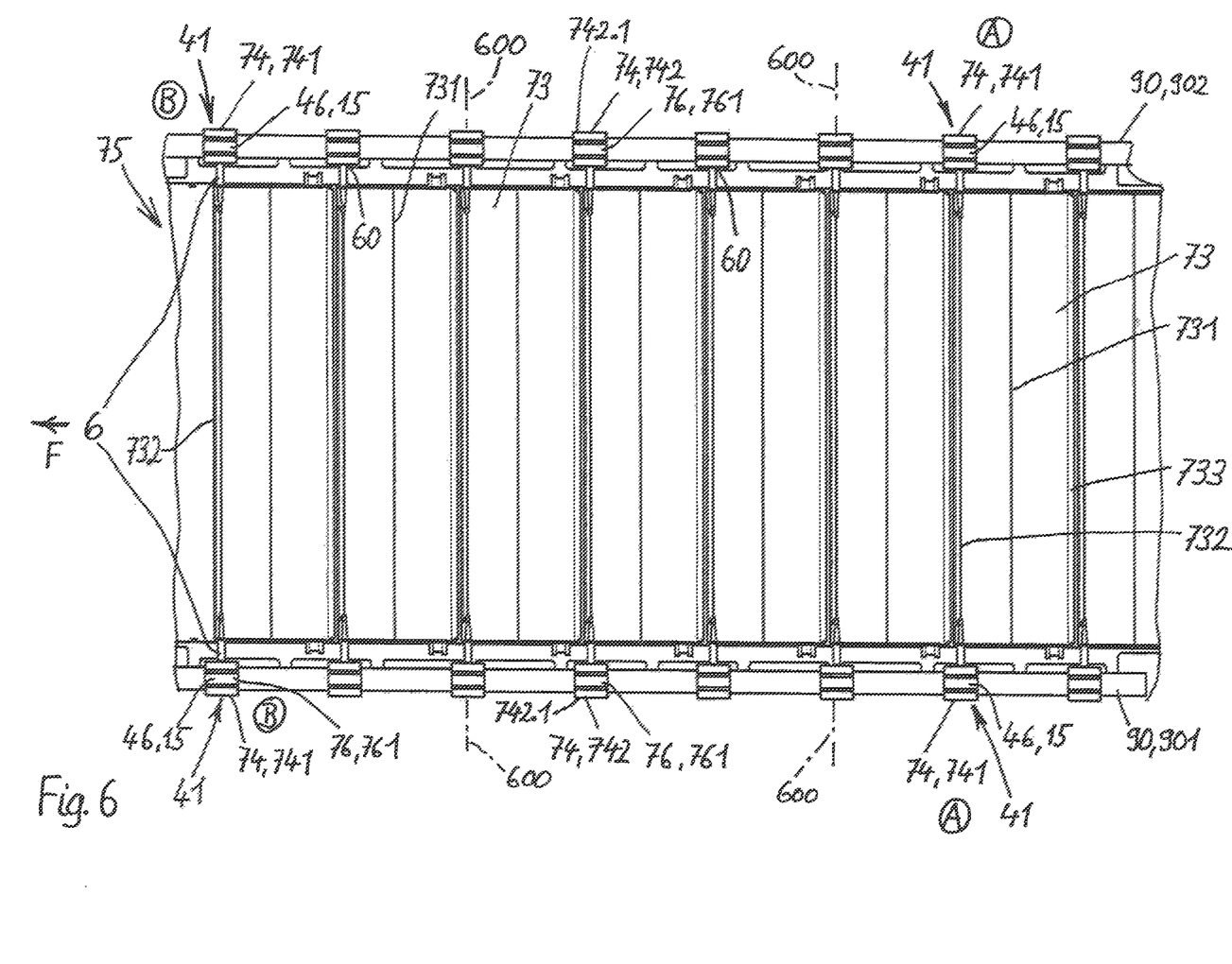
FIGS. 6 and 7 show in plan view, sections of a conveyor belt of a conveying device as in FIG. 5.
Figure 7:
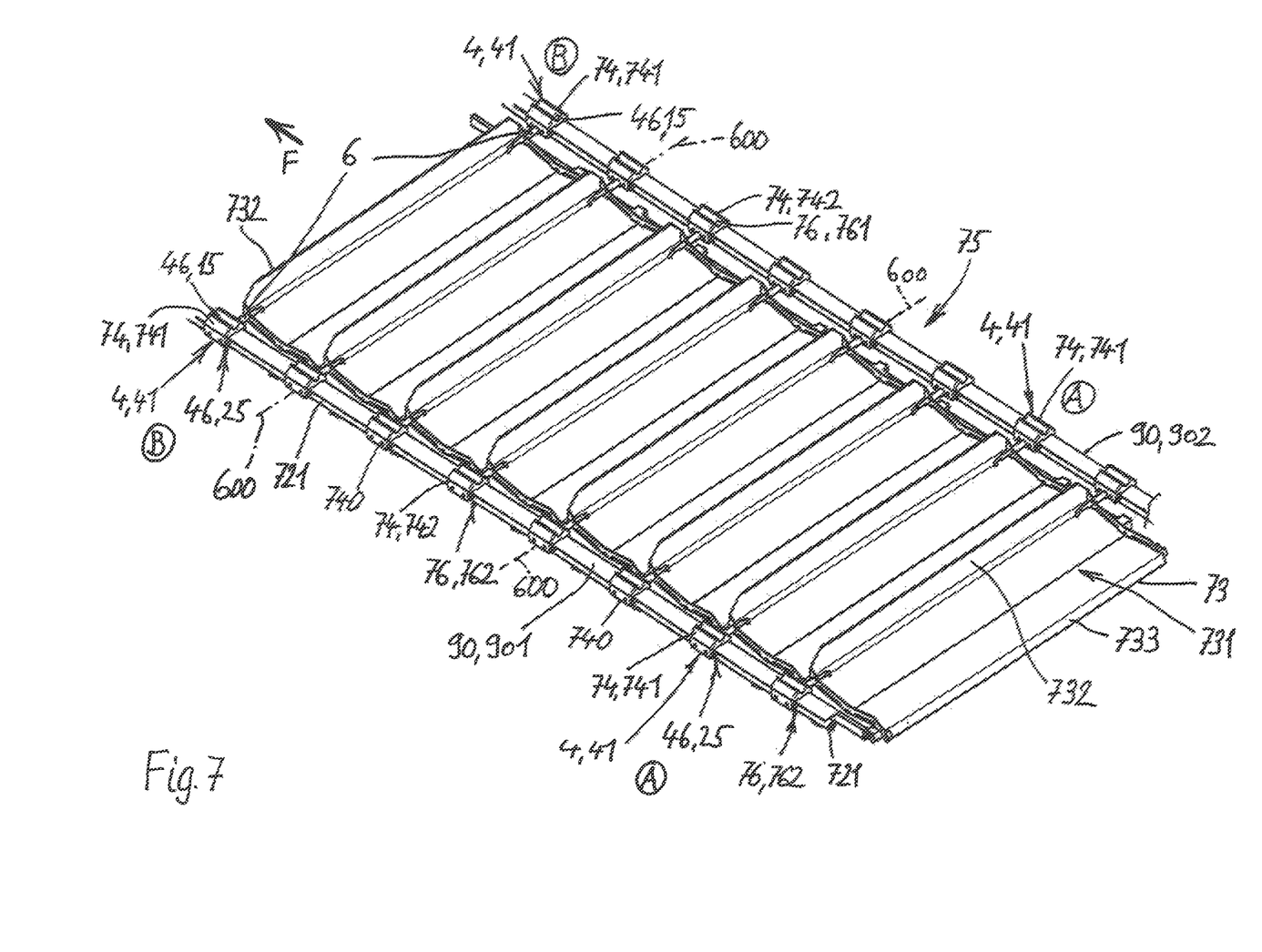

As can be seen from FIGS. 6 and 7, the two drive belts 901, 902, which are arranged and run in parallel and can be synchronously moved by way of the drive deflection wheels 710, carry transport elements 73 in a gapless parallel arrangement. Together with the paired supporting transport blocks 74, which are fastened to the drive belts 901, 902, these form a conveyor belt 75 continuously circulating in the conveying direction F. In the exemplary embodiment, the transport elements 73 are elements with troughs 731, which each receive at least one object for conveyance along the conveying path 78.

Each transport element 73 is supported by way of an associated pair of transport blocks 74. In the exemplary embodiment, a transport bearing 6 in the form of a pivot bearing is configured in each case to support the transport element 73. The pivot bearing has pivot bearing points forming bearing elements 60 on the transport blocks 74 of the transport pair. Deflection takes place on a projecting, in the direction of travel leading, transport edge 732 of the transport element 73. The other, in the direction of travel trailing, transport edge 733 of the transport element 73 is guided by a transport element guiding device (not shown) in such a manner that—as illustrated in FIGS. 5 to 7—the transport elements 73 in the sections 781 to 783 and 791 to 793 remain in layers lying substantially parallel to the flat drive belts 901, 902.

The conveying device 7 can be configured to move the transport elements 73 along the conveying path 78 from the loading point 81 to an unloading point 83 at the end of the conveying path 78 in the region of the deflection wheel 71. The conveying device 7 can be configured so that an unloading point 82 is provided at at least one location on the conveying path 78. The trailing transport edge 733 of the transport element 73 is then guided along a curve 730, so that the pivotable transport element 73 is pivoted downwards in the region of the unloading point 82. Deflection of the transport trough 731 can be controlled by way of a controllable points switch, which guides the trailing transport edge 733 into the way of the curve 730 when required.

Objects can be selectively distributed to several unloading points by way of a controller.

All transport blocks 74 are designed with identical and consistent external contours. As can be seen from FIGS. 5 to 7, they are traversed by the continuous flat drive belts 90, wherein they are securely, i.e. immovably, fastened onto each flat drive belt 90.

Each transport block 74 is a multi-functional block. The transport block 74 has guide elements 761, 762, which are guided in a sliding fit on guiding rails 72 of a guiding device 70, namely on first guiding rails 721 and second guiding rails 722, to guide the conveyor belt 75 in the horizontal and sloping sections 781 to 783, 791 to 793. The guiding rails 721 are arranged along the conveying path 78 and the guiding rails 722 along the return path 79. Apart from this guiding function, an additional function is the preferably swivelling bearing of the transport elements 73. A third function is down to the fact that the transport blocks 74 are driveable belt elements. Each transport block 74 is configured with a formed part 740 that forms a link element and, together with link recesses 711 on the circumference of the deflection wheels 71, belongs to a link guide. The link recesses 711 are evenly distributed around the circumference of each deflection wheel 71 at an interval from the transport blocks 74 on the drive belts 901, 902. The link guide ensures that, in the exemplary embodiment, the drive belts 901, 902 are deflected through 180° by way of the deflection wheels 71.

Each transport block 74 has a contour and shape similar to the connecting body 41 of the drive belt connecting device 4 described with reference to FIG. 4. Transport blocks 741, which are formed by connecting bodies 41, also have the function of connecting drive belt end sections 93, 94. One can see that the drive belt connecting device 4 can be lined up at any desired position as a transport block 74, 741 in the sequence of the other transport blocks 74, 742. There are no belt connecting points between the transport blocks 74. A transport block 74, 741 formed by the drive belt connecting device 4 can be readily inserted at several places in the belt run, e.g. to remove or replace a damaged or worn section of the circulating belt. For example, in FIGS. 6 and 7, connecting bodies 41 are fastened to the drive belts 901, 902 in a pair arrangement at points A and B. The arrangement is not restricted to the pair arrangement of connecting bodies 41 but the deflection can be provided on one side with one transport block 74, 742.

As described with reference to FIG. 4 and also to FIGS. 1 to 3, the formed part 740 forming a link part is formed as a head with a trapezoidal longitudinal cross-section, wherein the link recesses 711 are correspondingly trapezoidal. In the exemplary embodiment, the pivot bearing elements 60 are arranged in the longitudinal centre of the trapezoidal head on all transport blocks 74.

Finally, each transport block 74 also has guide elements 76, as has been described with reference to FIG. 4—and also FIGS. 1 to 3—, namely here in the form of a guiding longitudinal groove 15, otherwise designated 761, and in the form of a guiding longitudinal groove 25, generally designated 762.

It becomes clear from FIGS. 5 and 7 that the guiding longitudinal groove 762, 25 formed in the trapezoidal head lies on the associated guiding rail 721 as a sliding guide along the thus defined sections 781 to 783 of the conveying path 78. On the lower run, that is to say on the return path 79, the transport blocks 74, turned through 180°, with the guiding longitudinal groove 761, 15, sit on the corresponding guiding rail 722, which defines the course of the return path 79, with the sections 791 to 793. A third guiding rail 72, 723 of the guiding device 70, which is arranged in the transitional area between the section 781 and 782, is only shown as a dotted line in FIG. 5. The guiding longitudinal grooves 15, 761 rest on this guiding rail 723 to guide the conveyor belt 75 from the section 781 into the sloping section 782 without lifting off. A corresponding guide can be provided, for example, between the sloping section 792 and the horizontal section 793, on which the guide elements 25, 762 then rest.

The transport blocks 74, 742, which are fastened to each drive belt 901, 902 and are provided in a much greater number than the transport blocks 74, 741 formed by the drive belt connecting device 4, can expediently be constructed in a similar way to a connecting body 41. An embodiment consists of such a transport block 742 having—as shown in principle in FIGS. 1 to 3—a first outer connecting part, namely a first outer block part 742.1, but otherwise just one second outer connecting part, namely a second outer block part 742.2, once again in the form of a plug-in part to fit the first outer block part 742.1. Unlike the second outer connecting part 2, according to FIGS. 1 to 3, the second outer block part 742.2 is sufficiently dimensioned that, when it is fastened to the first outer block part 742.1, a space is created to match the flat shape of the single-layer undivided drive belt 901 or 902 to provide a positive-locking connection. In said connection, the tooth profile of the drive belt 901, 902 engages into the complementary tooth profile on a connecting surface of the second outer block part 742.2, while the smooth even surface of the drive belt 901, 902 fits against the correspondingly smooth and even connecting surface of the first outer block part 742.1. Such a transport block 74, 742 comprises a fastening mechanism, which fastens the first outer block part 742.1 and the second outer block part 742.2 to each other in the same way as the fastening mechanism 5 described with the aid of FIGS. 1 to 4. The predetermined limited distance between the contact surfaces of the first outer block part 742.1 and the second outer block part 742.2 is reduced to the dimension corresponding to the single thickness of the drive belt, in order to secure this in a positive-locking engagement in the internal block space between the two outer block parts.

The transport blocks 74, 742 that are not formed by the connecting bodies 41 can be fastened onto the drive belts 901, 902 in a different manner. As regards bearing and guiding of the transport elements 73, this depends upon the consistent formation of all transport blocks 74, 741, 742.

The invention claimed is:

1. A drive belt connecting device designed for a tension-resistant connection of flat drive belt end sections which each comprise two belt flat sides of which at least one is a first belt flat side having a belt surface profile, the connecting device comprising:
   a multi-part connecting body with a longitudinal dimension in the belt tension direction and being configured to retain there in flat drive belt end sections arranged in an overlapping arrangement, said multi-part connecting body having a connecting chamber to accommodate the flat drive belt end sections for connection;
   said multi-part connecting body comprising plural connecting parts fixable to each other for a tension-resistant connection of the flat drive belt end sections and including profiled connecting surfaces to provide connecting arrangements for positive-locking engagement into the belt surface profiles;
   said connecting chamber accommodating the drive belt end sections in an overlapping arrangement arranged along a connecting line extending in the longitudinal dimension of the multi-part connecting body;

a first outer connecting part of the multi-part connecting body and a second outer connecting part of the multi-part connecting body being arranged to bound the connecting chamber;

the first outer connecting part comprising a first outer connecting surface and the second outer connecting part comprising a second outer connecting surface with the first and second outer connecting surfaces being configured to be respectively engage with one of the flat drive belt end sections, whereby the flat drive belt end sections are arranged in a connecting arrangement;

an inner connecting part of the multi-part connecting body is arranged inside the connecting chamber and comprises a first inner connecting surface and an opposing second inner connecting surface;

said first inner connecting surface being configured to engage with one of the flat drive belt end sections and said second inner connecting surface being configured to engage with another of the flat drive belt end sections;

said first outer connecting surface and said first inner connecting surface being arranged opposite said second outer connecting surface and said second inner connecting surface; and a fastening mechanism arranged to fasten the first outer connecting part and the second outer connecting part to each other at a limited fixed distance between the first outer connecting surface and the second outer connecting surface; and an inner connecting mechanism arranged to connect the inner connecting part to at least one of the first or the second outer connecting parts and providing a connection that is secure in the belt tension direction.

2. The device of claim 1, wherein the fastening mechanism comprises plural fastening elements arranged outside the connecting chamber and extending transversally to the direction of the connecting line and transversally to a layering direction of the connecting parts as determined by the overlapping arrangement of the connecting parts.

3. The device of claim 1, wherein the inner connecting mechanism is configured to provide a secure positive-locking connection in the belt tension direction.

4. The device of claim 1, wherein the first inner connecting surface comprises a profile configured to provide a positive-locking engagement into the belt surface profile of the belt flat side of an associated flat drive belt end section.

5. The device of claim 1, wherein the second outer connecting surface comprises a profile configured to provide a positive-locking fit engagement into the belt surface profile of the belt flat side of an associated flat drive belt end section.

6. The device of claim 1, wherein the second inner connecting surface is configured to provide a planar connecting arrangement against a corresponding planar belt flat side of an associated flat drive belt end section.

7. The device of claim 1, wherein the first outer connecting surface is configured to provide a planar connecting arrangement against a corresponding planar belt flat side of an associated flat drive belt end section.

8. The device of claim 1, wherein the profiled connecting surfaces comprise a tooth profile that is complementary to a toothed belt profile.

9. The device of claim 1, wherein the first outer connecting surface and the second inner connecting surface are similarly configured to the first inner connecting surface and the second outer connecting surface.

10. The device of claim 1, wherein the inner connecting part is obliquely arranged inside the connecting chamber whereby an oblique overlapping of the drive belt end sections are connected along the connecting line.

11. The device of claim 1, wherein the first outer connecting part comprises a connecting housing having an internal housing inner chamber into which the inner connecting part and the second outer connecting part can be inserted in a snug fit.

12. The device of claim 11, wherein the multi-part connecting body is configured to provide a tension-resistant connection of flat drive belt end sections and which can be connected to a continuous flat drive belt by way of the tension-resistant connection.

13. The device of claim 1, wherein at least one guide element of the drive belt connecting device is configured to guide the drive belt connecting device longitudinally along a guide line.

14. The device of claim 13, wherein the at least one guide element is a guiding longitudinal groove that extends in a longitudinal dimension and is arranged on at least one of the first or second outer connecting parts, whereby the longitudinal groove is configured to engage with a sliding guide on a guiding rail determining the guide line.

15. The device of claim 1, wherein the multi-part connecting body comprises at least one link part that is shaped for positive-locking engagement into a link recess of a deflection device.

16. The device of claim 1, wherein a connecting element is arranged at least one outer connecting part and is configured to support a transport element.

17. A flat drive belt that is connected to a continuously circulating flat drive belt utilizing at least one drive belt connecting device in accordance with claim 1.

18. A conveying device comprising two flat drive belts according to claim 17, said two flat drive belts being arranged in a parallel arrangement at a parallel interval and which can be guided and driven to circulate together along a conveying path and a return path, and comprising at least two of the drive belt connecting devices.

19. The conveying device of claim 18, wherein the conveying path is formed by a conveyor belt is formed by a series of parallel transport elements and transport blocks.

20. The conveying device of claim 19, wherein the conveyor belt utilizes transport bearings configured as pivot bearings and which deflect the transport element to pivot back and forth around a transport element pivot axis.

21. The conveying device of claim 20, wherein the transport blocks form driveable belt elements with identical formed parts and that the conveying device is equipped with a pair of deflection wheels for circulation, wherein the deflection wheels have circumferential link recesses, which entrain the identical formed parts of the driveable belt elements for deflecting the belts.

22. The conveying device of claim 21, wherein the conveying device is equipped with a guiding device that has guiding rails arranged on the conveying path and the return path, and each transport block comprises at least one guide element that is guided by way of at least one associated said guiding rail.

23. The conveying device of claim 22, wherein each transport block comprises two guiding longitudinal grooves, wherein one said longitudinal guiding groove rests on a first guiding rail arranged on the conveying path and one said longitudinal guiding groove rests on a second guiding rail arranged on the return path.

24. The conveying device of claim 18, wherein the conveying path has a sloping section forming a sloping path, to which is assigned a guiding rail on which a guide element rests in such a way that the conveyor belt is guided into or out of the sloping path.

25. The conveying device of claim 19, wherein one transport block comprises a first outer block part and a second outer block part between which is formed an inner block space with limited fixed distance between positive-locking surfaces and which are in engagement with the drive belt.

26. The conveying device of claim 19, wherein the transport blocks are of identical design in terms of all external contours.

27. A drive belt connecting device designed for a tension-resistant connection of flat drive belt end sections which each comprise two belt sides of which at least one of the two belt sides is a belt side having a belt surface profile, the connecting device comprising:
- a multi-part connecting body with a longitudinal dimension in the belt tension direction and being configured to retain there in flat drive belt end sections arranged in an overlapping arrangement, said multi-part connecting body having a connecting chamber to accommodate the flat drive belt end sections for connection;
- said multi-part connecting body comprising plural connecting parts fixable to each other for a tension-resistant connection of the flat drive belt end sections and including profiled connecting surfaces to provide connecting arrangements for positive-locking engagement into the belt surface profiles;
- said connecting chamber accommodating the drive belt end sections in an overlapping arrangement arranged along a connecting line extending in the longitudinal dimension of the multi-part connecting body;
- a first outer connecting part of the multi-part connecting body and a second outer connecting part of the multi-part connecting body being arranged to bound the connecting chamber;
- the first outer connecting part comprising a first outer connecting surface and the second outer connecting part comprising a second outer connecting surface with the first and second outer connecting surfaces being configured to be respectively engage with one of the flat drive belt end sections, whereby the flat drive belt end sections are arranged in a connecting arrangement;
- an inner connecting part of the multi-part connecting body is arranged inside the connecting chamber and is located between the first and second outer connecting parts and comprises a first inner connecting surface and an opposing second inner connecting surface;
- said first inner connecting surface being configured to engage with one of the flat drive belt end sections and said second inner connecting surface being configured to engage with another of the flat drive belt end sections;
- said first outer connecting surface and said first inner connecting surface being arranged opposite said second outer connecting surface and said second inner connecting surface; and
- a fastening mechanism arranged to fasten the first outer connecting part and the second outer connecting part to each other at a limited fixed distance between the first outer connecting surface and the second outer connecting surface; and
- an inner connecting mechanism arranged to connect the inner connecting part to at least one of the first or the second outer connecting parts and providing a connection that is secure in the belt tension direction.

\* \* \* \* \*

UNITED STATES PATENT AND TRADEMARK OFFICE
CERTIFICATE OF CORRECTION

PATENT NO. : 10,605,330 B2
APPLICATION NO. : 16/096082
DATED : March 31, 2020
INVENTOR(S) : Ib Verner Dalgaard-Nielsen Page 1 of 1

It is certified that error appears in the above-identified patent and that said Letters Patent is hereby corrected as shown below:

On the Title Page

Column 1, item (71) Applicant, which reads:
"(71) Applicant: NORDISCHER MASCHINENBAU RUD. BAADER GMBH + CO. KG,
Luebeck (DE)"

Should read:
-- "(71) Applicant: NORDISCHER MASCHINENBAU RUD. BAADER GMBH + CO. KG,
Lübeck (DE)" --

Signed and Sealed this
Eighteenth Day of August, 2020

Andrei Iancu
*Director of the United States Patent and Trademark Office*